United States Patent
Weber

(10) Patent No.: US 12,227,078 B2
(45) Date of Patent: Feb. 18, 2025

(54) WORK MACHINE

(71) Applicant: Liebherr-Werk Nenzing GmbH, Nenzing (AT)

(72) Inventor: Fabian Weber, Wangen (DE)

(73) Assignee: LIEBHERR-WERK NENZING GMBH, Nenzing (AT)

(*) Notice: Subject to any disclaimer, the term of this patent is extended or adjusted under 35 U.S.C. 154(b) by 0 days.

(21) Appl. No.: 18/466,606

(22) Filed: Sep. 13, 2023

(65) Prior Publication Data

US 2024/0157797 A1     May 16, 2024

(30) Foreign Application Priority Data

Nov. 10, 2022  (DE) .............. 20 2022 106 309.5

(51) Int. Cl.
*B60L 1/00*     (2006.01)
*B66C 13/22*    (2006.01)
*E02F 9/20*     (2006.01)

(52) U.S. Cl.
CPC ............... *B60L 1/20* (2013.01); *B66C 13/22* (2013.01); *E02F 9/2091* (2013.01)

(58) Field of Classification Search
CPC .......... B60L 1/20; B66C 13/22; E02F 9/2091
USPC ............................. 74/335, 665 L
See application file for complete search history.

(56) References Cited

U.S. PATENT DOCUMENTS

| | | | |
|---|---|---|---|
| 10,756,369 B2* | 8/2020 | Lee .................... | H01M 8/04089 |
| 11,398,748 B2* | 7/2022 | Kambara ............ | H02J 7/00712 |
| 2022/0063421 A1* | 3/2022 | Mopagar ............. | B60L 1/003 |
| 2024/0227578 A1* | 7/2024 | Sarwe ................ | B60L 1/20 |

FOREIGN PATENT DOCUMENTS

| | | |
|---|---|---|
| CA | 2655334 A1 | 12/2007 |
| CN | 205945044 U | 2/2017 |
| DE | 102004010988 A1 | 9/2005 |
| DE | 102010063911 A1 | 6/2012 |
| DE | 102018127124 A1 | 4/2020 |
| DE | 102019133048 A1 | 6/2021 |

* cited by examiner

*Primary Examiner* — Ha Dinh Ho
(74) *Attorney, Agent, or Firm* — McCoy Russell LLP

(57) ABSTRACT

The disclosure relates to a work machine, comprising a primary energy source for feeding electric energy into a link, a gear for performing a task of the work machine, at least one electric drive connected to the link in order to operate the gear of the work machine, a holding brake for fixing or releasing the gear, and an energy store which is connected to the link in order to provide electric energy demanded from the link upon actuation of a gear and/or to absorb electric energy fed into the link. According to the disclosure, during an emergency lowering of the gear, the at least one electric drive to convert the kinetic energy into electric energy and to feed it into the link. In the event of an unavailability or failure, the primary energy source is configured to absorb the energy fed into the link by the electric drive.

10 Claims, 2 Drawing Sheets

WORK MACHINE

CROSS REFERENCE TO THE RELATED APPLICATION

The present application claims priority to German Patent Application No. 20 2022 106 309.5 filed on Nov. 10, 2022. The entire contents of the above-listed application are hereby incorporated by reference for all purposes.

TECHNICAL FIELD

The present disclosure relates to a work machine such as a crane or an excavator, for example a duty-cycle crawler crane, which is provided with a device for emergency lowering.

BACKGROUND

For a large number of work machines or vehicles, it is essential to return to a safe state in certain situations. For example, in the case of a crane or an excavator, it is of great importance to safely lower a lifted load to the ground in the event of a defect in the energy store. To ensure this, it is common practice in the prior art to provide a backup power supply or an oversized battery in the DC on-board power supply system (also known as the link) in order to be able to lower the load even in the event of a defect.

If an all-electric driven work machine has an energy store, e.g. a battery, arranged in a DC link, the energy stored therein is used to provide the energy required to carry out the lowering or to absorb the energy produced in the process.

The problem arises when the energy store, especially in the DC link, has a defect and is no longer able to supply or absorb energy for the emergency lowering. In such a case, damage to important components is accepted in order to maintain safety, so that, for example, the electric energy generated when lowering a load in the course of an emergency lowering can lead to overheating or damage to components. To achieve a safe state of the work machine in the course of an emergency lowering, for example, the possible damage of the holding brake is accepted. In order to prevent such possible damage, the prior art also includes braking resistors or braking choppers which convert the electric energy generated by an emergency lowering into thermal energy and thus prevent the risk of damage.

In addition or alternatively, a holding brake whose function is to secure or fix a gear of the work machine can also be used for a deceleration process, although this can also result in the holding brake, which is only configured for securing or releasing a position of the gear, being damaged in the process. The components of the work machine interacting with the holding brake during a deceleration also experience substantial damage in the process. However, all this is accepted in order to carry out an emergency lowering so that a safe state of the work machine is achieved.

As shown above, it is therefore disadvantageous if an emergency lowering of a gear of a work machine is to be carried out and at the same time the energy store arranged at the DC link is not available during the execution of the emergency lowering. According to the prior art, either additional components, namely brake resistors or braking choppers, must be provided for this purpose or damage to the holding brake must be expected.

It is the object of the present disclosure to be able to carry out an emergency lowering (=a controlled lowering of loads in case of failure of the battery storage) of a gear of a work machine without the disadvantages listed above, even if the energy store unit usually arranged in the DC link is not available for this purpose.

SUMMARY

The present objectives are achieved with a device as described herein.

A work machine according to the disclosure, in particular a crane or excavator, comprises a primary energy source for feeding electric energy into a link, a gear for performing a task of the work machine, at least one electric drive connected to the link to operate the gear of the work machine, a holding brake for fixing or releasing the gear, and an energy store connected to the link to provide electric energy demanded from the link upon actuation of a gear and/or to absorb electric energy fed into the link. The disclosure is characterized in that, in the event of an emergency lowering of the gear, the at least one electric drive is configured to convert the kinetic energy produced in the process into electric energy and to feed it into the link, wherein the primary energy source is configured to absorb the energy fed into the link by the electric drive in the event of unavailability of the energy store occurring simultaneously with the emergency lowering (for example, due to a failure of the energy store).

The work machine has at least one electric drive system (and may also have other loads, e.g. DC/DC converters, heaters, compressors, or the like), which is supplied from a common link, preferably a DC link. The at least one electric drive system may include, for example, a hoisting gear drive and/or a slewing gear. Each hoisting gear drive has a holding brake, which is actuated electrically or electro-hydraulically. To open the holding brake, it must be supplied with electric and/or hydraulic energy. An energy store, for example in the form of a battery, is located on the DC link. This energy store smoothens the load fluctuations caused by the electric drives and is able to absorb reverse power.

The energy for the working process of the work machine comes from the primary energy source, which may include or be, for example, one or more chargers or a diesel genset with HVDC connection (a high-voltage direct current connection). In normal operation, the energy flow from the primary energy source via the energy store is delayed in time to the drive system and possible loads.

If loads are lowered by hoisting gears with the aid of electric motors and inverters during emergency lowering, these must be supplied with electric power in order to be functional. In addition, the holding brake requires electric and/or hydraulic energy to be opened. For example, the hydraulic energy can be generated from electric energy by conversion. In both cases, the electric power is supplied by the primary energy source. To decrease the load on a gear, the holding brake must be opened. Subsequently, the load is lowered. By lowering, power is fed back into the DC link. Without an intact energy store, the voltage in the DC link increases, so that destruction of the components coupled to the DC link may occur under certain circumstances. According to the disclosure, it is therefore advantageous to use the primary energy source as a power sink to prevent damage to components coupled to the DC link.

The difference to the prior art is furthermore that additional components for lowering the load are not required. After the fault in the energy store system has been rectified, the work machine can resume operation without further repair work.

According to an advantageous modification of the present disclosure, it may be provided that the electric drive comprises an inverter connected to the link and an electric motor, preferably wherein a shaft of the electric motor is coupled, in particular rigidly coupled, to an associated gear.

This means that when a load is lowered by the gear, the electric motor is operated as a generator, so that the inverter transfers the resulting energy to the link. If, on the other hand, the electric motor is operated in the context of a movement, e.g. when lifting a load, the inverter must pick-up the energy required to this end from the link and make it available to the electric motor.

Advantageously, it can be further provided here that the inverter connected to the link is configured to convert a direct current in the link into an alternating current in order to supply the electric motor with alternating current and/or to convert an alternating current generated by the electric motor into direct current and feed it into the link.

In particular, the inverter can be a DC-AC inverter that is capable of converting direct current into alternating current and vice versa. Alternating current is usually required to operate an electric motor, whereas the link is often operated with direct current, since the losses incurring in this case are significantly lower.

According to an optional modification of the present disclosure, it may be further provided that in the event of a failure of the energy store occurring simultaneously with the emergency lowering, the primary energy source is configured to supply the link with an energy to provide the inverter of the at least one electric drive with a supply voltage.

This is advantageous because a minimum voltage must be applied at the DC input of the associated inverter in order to operate the at least one electric drive.

Due to the lack of a functional energy store, the energy required for this purpose, in particular the voltage, is provided directly by the primary energy source.

According to an advantageous further development of the present disclosure, it can be provided that, in the event of a failure of the energy store occurring simultaneously with the emergency lowering, the primary energy source is configured to supply the link with an energy so that the holding brake supplied with energy from the link is capable of releasing the gear. In order to transfer a gear fixed by the holding brake into a safe position in the context of an emergency lowering, first of all a certain energy is required with which the holding brake can be transferred into an open state for releasing the gear. If the energy store on which the energy normally required for this is retrieved is defective, the primary energy source also steps in in this case and supplies the holding brake with sufficient energy for releasing the gear.

Further, according to the present disclosure, it may be provided that in the event of a failure of the energy store occurring simultaneously with the emergency lowering, the primary energy source is configured to absorb energy fed into the link by the at least one gear via the electric drive, which energy was created during a lowering to a safe state.

Since the energy store is also no longer capable of absorbing the energy created when the gear is lowered, the primary energy source is used as a power sink to prevent damage to the components coupled to the DC link. If, on the other hand, the primary energy source were not to absorb the energy fed into the DC link by the electric drive when the gear is lowered, this could result in the unreduced energy causing damage to the components coupled to the DC link because the voltage in the DC link increases.

According to a further advantageous embodiment of the present disclosure, the primary energy source can be at least one charger and/or a fuel-powered generator set, for example powered by diesel, hydrogen or the like. In this case, the charger as well as the generator set have sufficient capacity to absorb the energy produced in the event of an emergency lowering or to provide the energy required for emergency lowering. The genset can absorb power because the engine drives a diesel engine. The diesel engine is then effectively an air pump. The charger feeds the energy back into the three-phase network and cannot itself convert any energy or power.

According to a further development of the present disclosure, it may be provided that, in the event of a failure of the energy store occurring simultaneously with the emergency lowering, the electric drive is configured to limit a rotational speed in the electric motor caused by a lowering of a gear so as not to exceed a maximum received power of the primary energy source.

Since the primary energy source is, of course, not primarily configured to absorb the energy produced during lowering of a gear, its capability for received power may be limited. In order to take this into account, the disclosure can provide that in the event of an emergency lowering with a simultaneously defective energy store, the lowering of a gear takes place at a significantly slower rate so as not to exceed the maximum received power of the primary energy source. Since the power fed into the DC link is directly proportional to the speed of a lowering operation, the reduction of the lowering speed also causes a reduction of the reverse power.

According to another optional further development of the present disclosure, it may be provided that in the event of a failure or unavailability of the energy store occurring simultaneously with the emergency lowering, the primary energy source is configured to supply the link with an energy to so that the holding brake supplied with energy from the link is capable of releasing the gear to bring the gear into a safe position.

If the lowering process has been carried out successfully, it is still necessary to fix the lowered gear at the lowered position reached. The holding brake is used for this purpose. If energy is required for this, it is provided by the primary energy source. Here, too, the defective energy store cannot supply any energy required for fixing, so that the primary energy source can be used again.

Further, according to the present disclosure, it may be provided that in the event of a failure of the energy store occurring simultaneously with the emergency lowering, the primary energy source is configured to lower the voltage remaining in the link after the at least one gear has been lowered to a safe position by the primary energy source operating as an energy sink.

Finally, it can be provided that the voltage level in the link is reduced to such an extent that there is no longer any danger. To achieve this state, the voltage remaining in the DC-link is supplied to the primary energy source, which operates as an energy sink. The advantage of this is that a technician can work on the machine without having to wait for a long time until the link voltage has decreased.

According to the disclosure, it can further be provided that the at least one gear is a hoisting gear or a slewing gear of a work machine.

In addition, according to the disclosure, it may be provided that the work machine is an all-electric work machine in which preferably each gear is actuated by an electric drive.

The disclosure further comprises a method for controlling a work machine according to any of the above-mentioned variants.

According to the method, it may be provided that in case of a defective energy store and the request for emergency lowering, the energy required for emergency lowering is provided by the primary energy source.

Thus, it can be advantageously provided that the supply voltage required for operating an inverter is made available by the primary energy source. This is the only way to ensure that the conversion via the inverter can continue to take place.

It may further be provided that the primary energy source provides the energy to open a holding brake if the energy store has failed in case of an emergency lowering.

In addition, it can be provided that the primary energy source also acts as an energy sink in this case in order to absorb the energy fed into the link when a gear is lowered. Advantageously, it can be provided that the rotational speed is reduced when the gear is lowered so that the maximum received power of the primary energy source is not exceeded.

If the gear is then in a safe position, the holding brake is closed. According to an optional further development of the method, it can be provided that an energy required for closing the holding brake originates from the primary energy source.

Finally, in the event of an emergency lowering in the case of a defective energy store, it can be further provided that the primary energy source is used as an energy sink for lowering the link voltage.

BRIEF DESCRIPTION OF THE FIGURES

Further features, details and advantages will be apparent from the description of the Figures given below. Shown are in.

DETAILED DESCRIPTION

Figure 1:
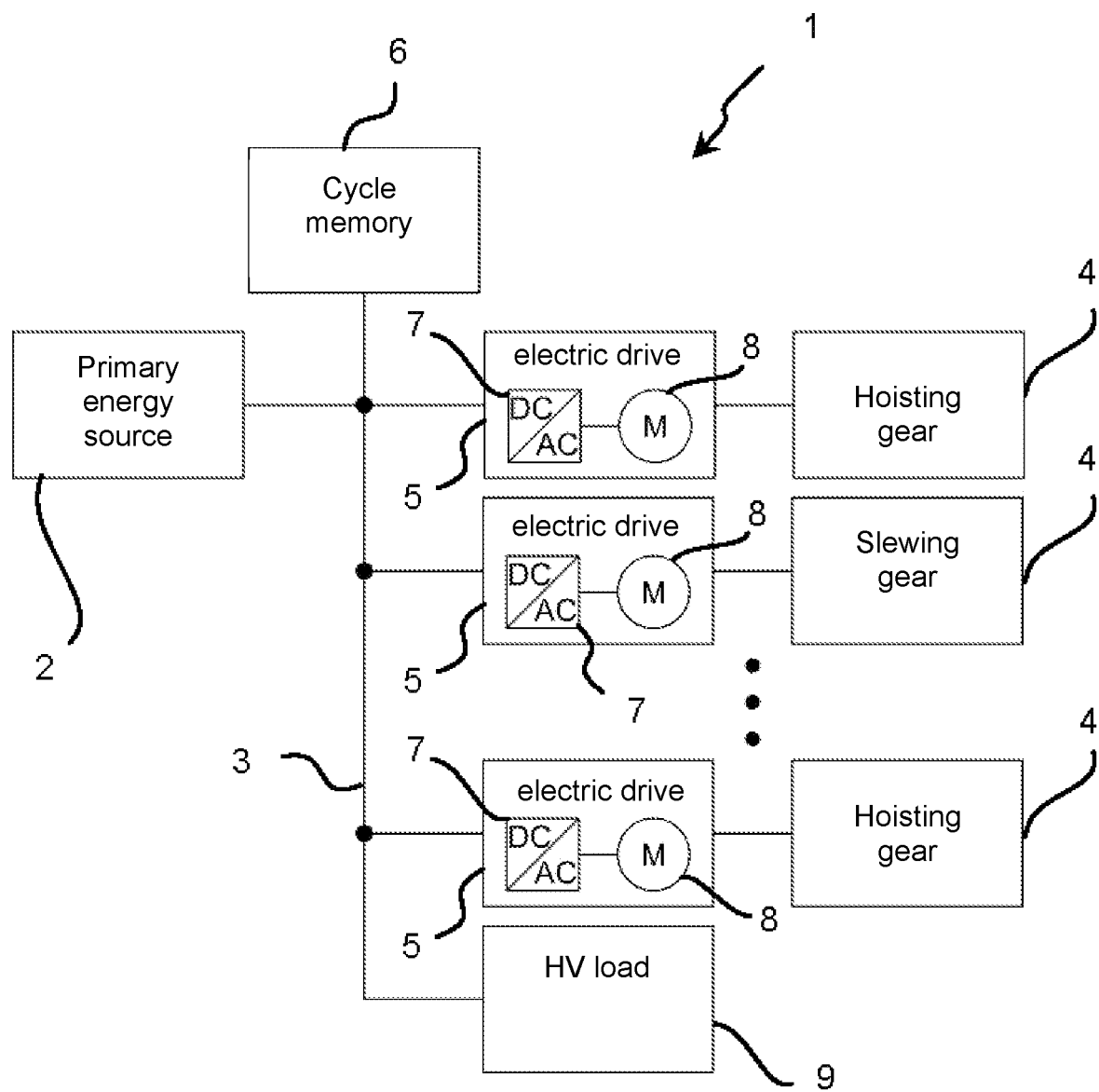
FIG. 1: a schematic basic structure of the work machine according to the disclosure.

FIG. 1 shows a schematic basic structure of a work machine 1 according to the disclosure.

Shown is a fully-electric work machine 1, in which the gears 4 that perform the work of the machine 1 are configured by electric drives 5. The work machine 1 comprises several electric drives 5, each of which has an inverter 7 and an electric motor 8. The electric drives 5 are mechanically coupled, via the shaft of the electric motor 8, to the respective associated gear 4. Each of the gears 4 has a holding brake (not shown in FIG. 1), which holds a load lifted or operated by the gear 4. The respective inverters 7 of the electric drives 5 are electrically connected to the link 3, preferably the DC link.

Optionally, further high-voltage loads 9, such as high-voltage heaters, DC/DC converters, compressors or the like, are located on the DC link 3.

The work machine 1 further comprises an energy store 6, which is also connected to the DC link 3. The energy store 6 is both a source and a sink for electric energy during the working process of the work machine 1. Furthermore, the work machine 1 also has a primary energy source 2, which is, for example, a generator set (also: genset) or a charger. The primary energy source 2 supplies the work machine 1 with electric energy.

The electric drives 5 can be configured in such a way that they are capable of feeding back electric energy. This is the case, for example, when lowering a load on a gear 4 configured as a hoisting gear, in which the kinetic energy of a lowering is converted into electric energy via regenerative operation of the electric motor 8. The inverter 7 connected to the electric motor 8 then ensures that the recuperated electric energy is fed into the DC link 3. The electric energy fed back into the DC link 3 in the process is absorbed by the energy store unit 6 during normal operation, which acts as an energy sink in this case. The design of the energy store ensures that the DC link 3 is not loaded with too much energy, which could damage the components coupled to the DC link 3. The storage has a high potential received power and is therefore capable of absorbing the static and dynamic reverse power with a moderate increase in the link voltage. Furthermore, it should be noted that in order to operate the electric drives 5, it may be necessary to apply a minimum voltage to the DC input of a respective inverter 7 in order to be able to perform the conversion of energy from direct current to alternating current and vice versa.

Figure 2:
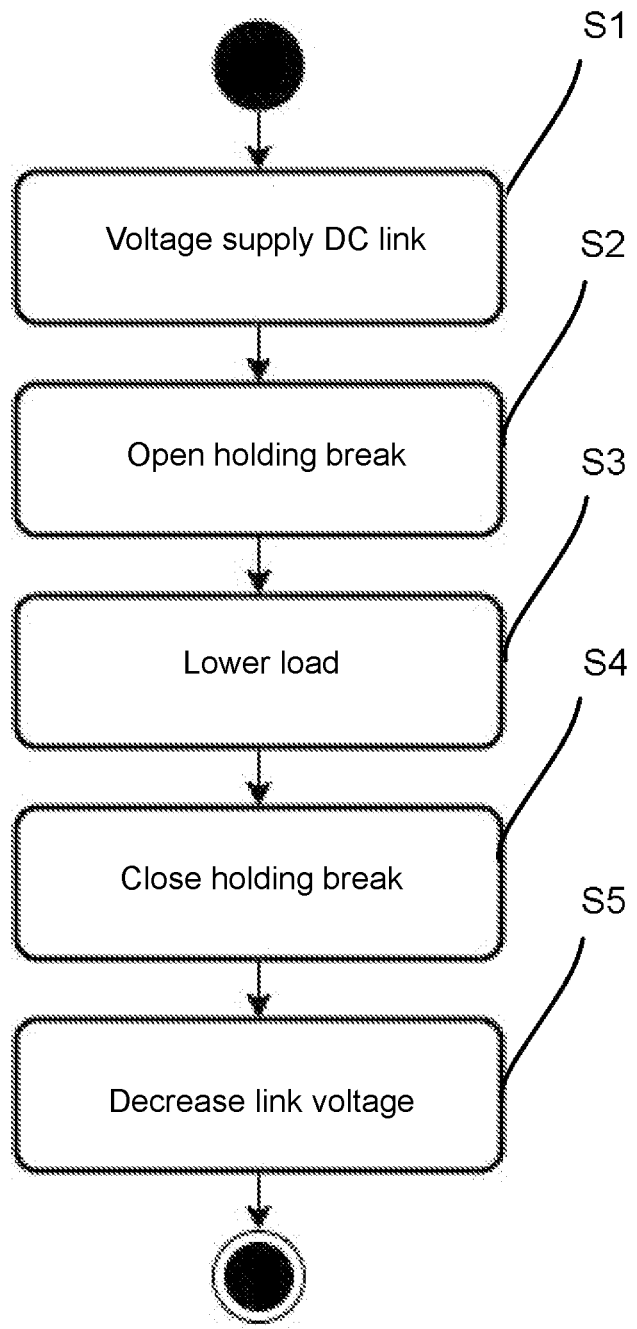
FIG. 2: a flowchart illustrating the different steps of a control unit of the work machine or a method used to control the work machine.

FIG. 2 now shows a sequence of steps S1 to S5, which are performed by a control unit of a work machine 1 or a method of the present disclosure if an emergency lowering of a gear 4 is required and at the same time the energy store 6 fails. The control unit may receive signals from one or more sensors as described herein and process the signals to generate outputs sent to actuators as described herein. The control unit may include a processor and memory including instructions for carrying out the control operations described herein based on the sensor inputs.

In the event of a failure of the energy store 6, the sink for the electric energy typically used in an emergency lowering is missing. Furthermore, the energy store 6 can also no longer provide the minimum voltage to be applied to a respective inverter 7. This results in that none of the gears 4 of the work machine 1 can be operated, so that it is not possible to transfer the work machine 1 into a safe state by means of the emergency lowering.

In the first step of the diagram shown in FIG. 2, it is ensured that a voltage is present in the DC link 3 so that the inverters 7 are ready for operation (S1). To provide the voltage at the DC link 3, the primary energy source 2 is used as the electric energy source.

Subsequently, in step S2, the holding brake of the gear 4 is opened. Electric energy from the DC link 3, which is also provided by the primary energy source 2, is used for opening.

Particularly in the case of gears 4 with vertical loads, e.g. a hoist gear or similar, the gear 4 rotates after the holding brake is opened due to a decrease in the load (S3) caused by the weight force. As a result, energy is fed back into the link 3. In this case, the energy is generated by a regenerative operation of the electric motor 8. The energy fed back into the DC link 3 is absorbed by the primary energy source 2. It can be advantageous here if the speed of the gear 4 is limited in such a way that the maximum received power of the primary energy source 2 is not exceeded.

If the gear 4 is then in a safe state in the subsequent step S4, the holding brake is closed. If energy is required to close the holding brake, said energy comes from the primary energy source 2, which now acts as a source again.

In the last step S5, the link voltage is lowered so that there is no longer any danger from the DC link 3 during a maintenance intervention or the like. Here, the primary energy source 2 is used as an energy sink.

In contrast to implementations from prior art, additional components for lowering the load can be dispensed with, which would normally be necessary in the case of emergency lowering and simultaneously defective energy store.

The invention claimed is:
1. Work machine, comprising:
   a primary energy source for feeding electric energy into a link,
   a gear for performing a task of the work machine,
   at least one electric drive connected to the link to operate the gear of the work machine,
   a holding brake for fixing or releasing the gear, and
   an energy store connected to the link to provide electric energy demanded from the link upon actuation of the gear and/or to absorb electric energy fed into the link, wherein
   in the event of an emergency lowering of the gear, the at least one electric drive is configured to convert kinetic energy that is produced into electric energy and to feed the electric energy into the link, wherein
   in the event of an unavailability or failure of the energy store prevailing simultaneously with the emergency lowering, the primary energy source is configured to absorb the energy fed into the link by the electric drive.
2. Work machine according to claim 1, wherein the electric drive comprises an inverter connected to the link and an electric motor.
3. Work machine according to claim 2, wherein the inverter connected to the link is configured to convert a direct current in the link into an alternating current in order to supply the electric motor with alternating current and/or to convert an alternating current generated by the electric motor into direct current and feed the direct current into the link.
4. Work machine according to claims 2, wherein, in the event of a failure occurring simultaneously with the emergency lowering or an unavailability of the energy store occurring simultaneously with the emergency lowering, the primary energy source is configured to supply the link with an energy to provide the inverter of the at least one electric drive with a supply voltage.

5. Work machine according to claim 1, wherein, in the event of a failure occurring simultaneously with the emergency lowering or an unavailability of the energy store occurring simultaneously with the emergency lowering, the primary energy source is configured to supply the link with an energy so that the holding brake supplied with energy from the link is capable of releasing the gear.
6. Work machine according to claim 4, wherein, in the event of the failure occurring simultaneously with the emergency lowering or the unavailability of the energy store occurring simultaneously with the emergency lowering, the primary energy source is configured to absorb energy fed into the link by the at least one gear via the electric drive, which energy was created during a lowering into a safe state.
7. Work machine according to claim 6, wherein, in the event of the failure occurring simultaneously with the emergency lowering or the unavailability of the energy store occurring simultaneously with the emergency lowering, the electric drive is configured to limit a rotational speed in the electric motor caused by a lowering of a gear so as not to exceed a maximum received power of the primary energy source.
8. Work machine according to claim 1, wherein in case of a failure occurring simultaneously with the emergency lowering or an unavailability of the energy store occurring simultaneously with the emergency lowering, the primary energy source is configured to supply the link with an energy, so that the holding brake supplied with energy from the link is capable of releasing the gear in order to bring the gear into a safe position.
9. Work machine according to claim 6, wherein, in the event of the failure occurring simultaneously with the emergency lowering or the unavailability of the energy store occurring simultaneously with the emergency lowering, the primary energy source is configured to lower the voltage remaining in the link after the at least one gear has been lowered into a safe position by the primary energy source operating as an energy sink.
10. Work machine according to claim 6, wherein the at least one gear is a hoisting gear, a retracting gear or a slewing gear.

* * * * *